US012047749B2

(12) United States Patent
Schmidt et al.

(10) Patent No.: US 12,047,749 B2
(45) Date of Patent: Jul. 23, 2024

(54) CABLE

(71) Applicant: SONOVA AG, Staefa (CH)

(72) Inventors: Mark Schmidt, Breslau (CA); Aistis Januszko, Kitchener (CA); Ming-Lun Dave Ma, Markham (CA); Ilan Rashish, Kitchener (CA)

(73) Assignee: Sonova AG, Staefa (CH)

( * ) Notice: Subject to any disclaimer, the term of this patent is extended or adjusted under 35 U.S.C. 154(b) by 268 days.

(21) Appl. No.: 17/518,072

(22) Filed: Nov. 3, 2021

(65) Prior Publication Data

US 2022/0141603 A1 May 5, 2022

(30) Foreign Application Priority Data

Nov. 5, 2020 (EP) .................................... 20205926

(51) Int. Cl.
*H04R 25/00* (2006.01)
*H01B 7/04* (2006.01)
*H01B 11/02* (2006.01)

(52) U.S. Cl.
CPC ............ *H04R 25/556* (2013.01); *H01B 7/04* (2013.01); *H01B 11/02* (2013.01)

(58) Field of Classification Search
CPC ................................ H01B 7/04; H01B 11/02
See application file for complete search history.

(56) References Cited

U.S. PATENT DOCUMENTS

| | | | | |
|---|---|---|---|---|
| 5,789,711 A | 8/1998 | Gaeris | | |
| 6,300,573 B1 | 10/2001 | Horie | | |
| 6,462,268 B1 | 10/2002 | Hazy | | |
| 2003/0031336 A1 | 2/2003 | Harrison | | |
| 2010/0067725 A1 | 3/2010 | Schumaier | | |
| 2010/0092016 A1* | 4/2010 | Iwano | H04R 25/656 381/313 | |
| 2010/0124346 A1* | 5/2010 | Higgins | H04R 25/55 439/86 | |
| 2015/0257315 A1* | 9/2015 | Wagner | H01B 3/18 174/102 C | |
| 2016/0263768 A1* | 9/2016 | DeCicco | B23D 47/08 | |

FOREIGN PATENT DOCUMENTS

| | | | |
|---|---|---|---|
| EP | 0596147 A1 * | 5/1994 | D04C 3/18 |
| EP | 1607985 | 6/2016 | |
| EP | 3343952 | 7/2018 | |

OTHER PUBLICATIONS

"Extended European Search Report received in EP Application No. EP20205926.7 on Apr. 9, 2021."

* cited by examiner

*Primary Examiner* — Mark Fischer
(74) *Attorney, Agent, or Firm* — ALG Intellectual Property, LLC

(57) ABSTRACT

A cable for a hearing device, comprising a plurality of conductors, comprising conductors arranged in twisted pairs (TP1 to TP4) wound around a plastically deformable core wire (FW).

6 Claims, 2 Drawing Sheets

CABLE

RELATED APPLICATIONS

The present application claims priority to EP Patent Application No. EP 20205926.7, filed Nov. 5, 2020, the contents of which are hereby incorporated by reference in their entirety.

BACKGROUND INFORMATION

Hearing instruments typically use a microphone to pick up/receive sound. Circuitry in the hearing instrument can process signals from the microphone and other types of sensors, and provide the processed sound signal into an ear canal of a user via a miniature loudspeaker, commonly referred to as a sound reproduction device or a receiver.

Microphones and receivers can be referred to as transducers.

In combining multiple transducers, for example microphones and receivers, into one module that is separated from a signal processing and drive unit via a single cable, the risk of cross-talking between input signals and output signals, e.g. audio signals and digital signals, and noise pick up dramatically increases when compared with situations where the microphones and receivers do not share a single cable. In particular, running receiver drive signals in parallel to microphone output signals can result in significant pollution of the microphone outputs. The magnitude of that effect depends on the receiver signal current and microphone output, line and input stage impedances.

BRIEF DESCRIPTION OF THE DRAWINGS

The present disclosure will become more fully understood from the detailed description given hereinbelow and the accompanying drawings which are given by way of illustration only, and thus, are not limitive of the present disclosure, and wherein.

Corresponding parts are marked with the same reference symbols in all figures.

DETAILED DESCRIPTION

Figure 1:
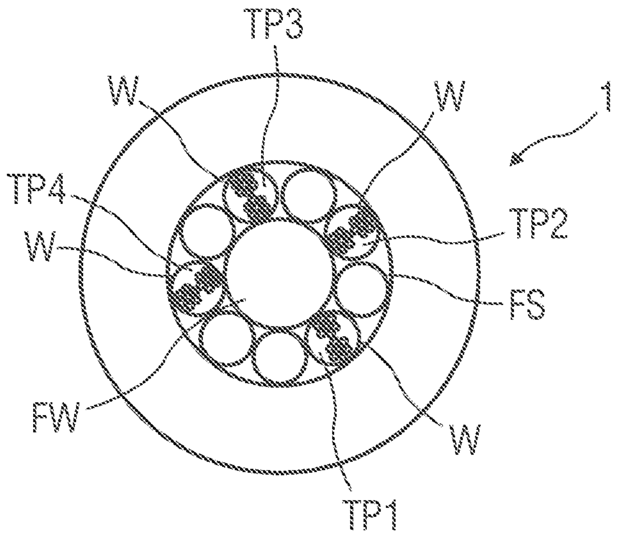
FIG. 1 is a schematic sectional view of a cable.

The disclosure relates to a cable, in particular for a hearing device, e.g. to connect a transducer module or In-the-Ear module comprising of multiple transducers or other electronic components.

It is a feature of the present disclosure to provide an improved cable.

As described herein, a cable comprises a plurality, e.g. an even number, of conductors, comprising conductors arranged in twisted pairs wound around a plastically deformable core wire, e.g. a forming wire. The cable is thus formable holding its resultant shape using a forming wire.

In an exemplary embodiment the core wire is made of a malleable material such as a metal or a plastic, e.g. a stainless-steel core wire.

In an exemplary embodiment at least one filler strand is arranged between two of the twisted pairs arranged next to each other.

In an exemplary embodiment at least one filler strand is arranged between two of the twisted pairs arranged next to each other in each case.

In an exemplary embodiment the filler strand is a made of non-conductive material such as plastic, e.g. a clear polyamide filler wire.

In an exemplary embodiment the core wire may be grounded.

In an exemplary embodiment at least one of the twisted pairs may be shielded by a respective shielding wrap arranged around said twisted pair.

In an exemplary embodiment, at least one end of the cable may comprise a connector comprising a plurality of pins respectively electrically connected to at least one of the conductors of the cable.

In an exemplary embodiment, the core wire may be mechanically fixed to the connector.

According to an aspect of the present disclosure the cable may be used in a hearing device or a wearable device to connect a transducer module or In-the-Ear module comprising multiple transducers or electronic components such as transducers, sensors or sensor modules. Moreover, the cable may be used in a hearing device or a wearable device to connect any type of sensor or sensor module comprising multiple sensors and/or other components, e.g. at least one of a blood pressure sensor, a heart rate sensor, a microphone and a receiver.

The cable may be applied in a hearing device, further comprising an In-the-Ear module or transducer module comprising multiple electronic components such as transducers and sensors, wherein the cable connects the transducer module or In-the-Ear module, the transducer module or In-the-Ear module having at least two input lines and two output lines, wherein the two input lines are carried in one of the twisted pairs and/or wherein the two output lines are carried in one of the twisted pairs, e.g. in another one of the twisted pairs.

In an exemplary embodiment the transducer module or In-the-Ear module has at least two power supply lines carried in another one of the twisted pairs.

In an exemplary embodiment the transducer module or In-the-Ear module has at least two ground lines carried in another one of the twisted pairs.

In an exemplary embodiment the twisted pair conducting the input lines and/or the twisted pair conducting the output lines may be shielded by a respective shielding wrap arranged around said twisted pair.

In an exemplary embodiment the twisted pair conducting the input lines is arranged next to the twisted pair conducting the power supply lines and next to the twisted pair conducting the ground lines.

In an exemplary embodiment the twisted pair conducting the input lines is arranged next to the twisted pair conducting the power supply lines and next to the twisted pair conducting the output lines.

In an exemplary embodiment one or more, in particular two, filler strands are arranged between the twisted pair conducting the input lines and the twisted pair conducting the output lines, wherein one respective filler strand is arranged between all other pairs of twisted pairs arranged next to each other.

According to an aspect of the present disclosure, a kit may be provided, comprising two, three or more cables as described above, the cables having different lengths. This may facilitate a hearing aid professional to customize a hearing aid to the geometry of an ear of a user.

The disclosure aims at enabling the separation of a signal processing and power supply unit from a housing containing both input and output transducers by means of a single formable cable assembly.

The configuration of the cable according to the disclosure enables a substantially reduced crosstalk and noise between relatively high current, low impedance signals such as those that would drive a receiver in a personal audio amplification device and low current, high impedance signals such as those that would carry a microphone signal in situations where these signal conductors share a common cable assembly and thus are physically in parallel by selectively twisting pairs of conductors. This in combination with a configurable core wire enables the user of the cable to manipulate and shape the cable to meet the application needs A reduction in crosstalk may allow for reduced potential for feedback where amplification is applied, reduced distortion and noise pickup, and improved sound quality.

The cable may be applied in a hearing aids, a hearable or a wearable.

Further scope of applicability of the present disclosure will become apparent from the detailed description given hereinafter. However, it should be understood that the detailed description and specific examples, while indicating example embodiments of the disclosure, are given by way of illustration only, since various changes and modifications within the spirit and scope of the disclosure will become apparent to those skilled in the art from this detailed description.

FIG. 1 is a schematic sectional view of a cable 1, in particular for use in a hearing device, e.g. for connecting a transducer module comprising multiple transducers such as one or more microphones and/or one or more receivers.

The present disclosure proposes a specific physical arrangement of conductors in the cable 1 to minimize the effects of crosstalk/cross-contamination and noise pickup. In the example given herein, a total of eight conductors are assumed, in the following configuration:

- two input lines TP1 as a twisted pair, for example two microphone signal lines,
- two power supply lines TP2 as a twisted pair, for example a positive voltage supply line and a negative voltage supply line for a microphone,
- two ground lines TP3 as a twisted pair, for example double-redundant ground for shielding,
- two output lines TP4 as a twisted pair, for example two receiver drive lines.

In other embodiments, the signals may be distributed in a different way to the twisted pairs TP1 to TP4. For example, twisted pair TP1 may carry a signal line and one power line and twisted pair TP2 may carry another signal line and another power line.

These eight lines TP1 to TP4 are wound around a central core wire FW which may be made of a malleable material, e.g. a stainless-steel forming wire, that allows shaping of the cable 1 to suit a given physical application allowing for flexibility and shaping by a user.

To minimize crosstalk and noise, the eight lines are arranged around the core wire FW as twisted pairs TP1 to TP4 with filler strands FS which may be made of a non-conductive material, e.g. clear polyamide (nylon) filler wires, in between the pairs to reduce coupling and produce a smoother outer finish around the entire cable assembly.

In the embodiment shown one filler strand FS is arranged between the twisted pairs TP1 and the twisted pairs TP2, one filler strand FS is arranged between the twisted pairs TP2 and the twisted pairs TP3, one filler strand FS is arranged between the twisted pairs TP3 and the twisted pairs TP4, and two filler strands FS are arranged between the twisted pairs TP4 and the twisted pairs TP1. The skilled person readily understands that different configurations, in which different numbers of filler strands FS are arranged between the twisted pairs TP1 to TP4 are possible.

Moreover, the skilled person readily understands that though four twisted pairs or eight conductors are used in the illustrated embodiment, the solution is applicable to any arrangement if there is an even number of conductors. If the number of conductors is odd, the solution may be applied to an even number subset of the conductors.

Figure 2:
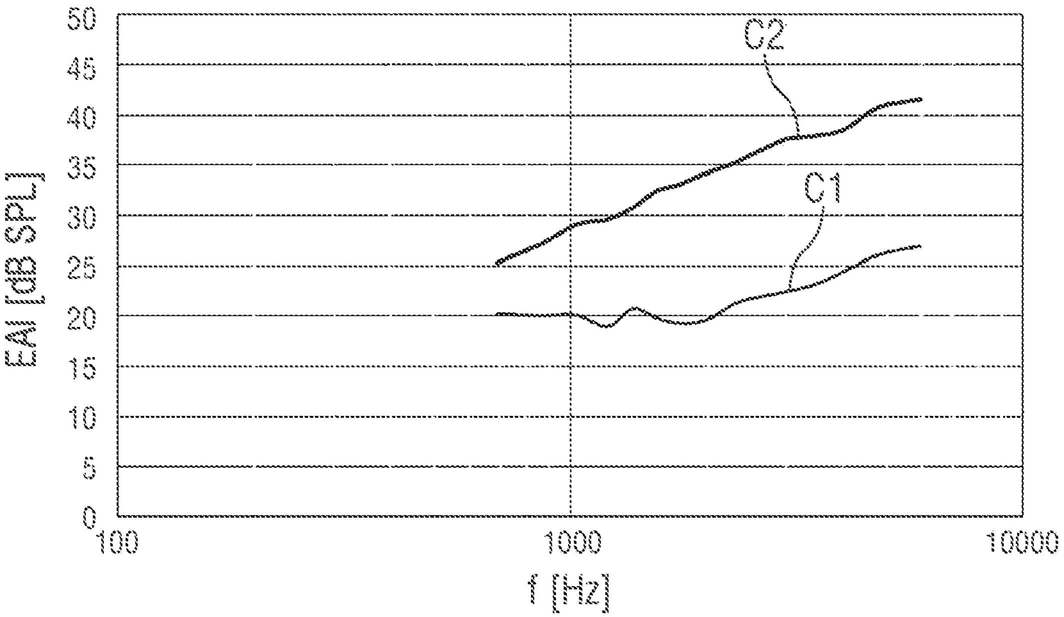
FIG. 2 is a schematic diagram showing crosstalk for different conductor/signal assignments.

To demonstrate the efficacy of the twisted pair scheme and as an example, some measurements of crosstalk are shown in the schematic diagram of FIG. 2 for different conductor/signal assignments. FIG. 2 shows electrical crosstalk at 0 dB FS, wherein equivalent acoustic input EAI in dB. SPL is shown over frequency f. In this example, these measurements have been obtained by driving a nominally 200 Ohm receiver with a 900 mV RMS signal across the frequencies shown. A microphone (sensitivity −37.0 dB re 1V/1 Pa) had its output, power supply and ground lines connected through the cable 1, parallel to the receiver signals. The crosstalk magnitude was taken as the microphone output voltage with no acoustic signal; only the crosstalk-induced signal was present (alongside inherent electrical noise). This voltage was then converted to dB SPL to produce the resulting plots.

The equivalent acoustic input EAI as measured by the microphone input stage shows a decrease of about 15 dB across most of the frequency range measured for curve C1 referring to the receiver drive lines arranged as twisted pair TP4 as opposed to curve C2 referring to the receiver drive lines arranged non-twisted.

There may be some variability depending on which conductors carry which signals around the core wire FW and this is especially evident in the non-twisted pair cases. Having microphone and receiver lines further apart on the cable cross-section appears to decrease the crosstalk. Nonetheless, the twisted pair configuration yields much lower crosstalk overall.

It should also be noted that the crosstalk increases with frequency so that any harmonics of the drive signal will be more strongly coupled to the microphone than the fundamental. Reducing crosstalk then has the added benefit of reducing the distortion coupled back to the microphone output.

In an exemplary embodiment the core wire FW may be grounded to improve noise reduction.

In an exemplary embodiment a shielding wrap W may be arranged around the interfering signals, e.g. TP1 and/or TP4, to improve noise reduction.

In an exemplary embodiment at least one end of the cable 1 may comprise a connector comprising a plurality of pins respectively electrically connected to at least one of the conductors of the cable 1. In an exemplary embodiment both ends of the cable 1 may comprise a connector.

In an exemplary embodiment the core wire FW may be mechanically fixed to the connector.

In an exemplary embodiment, a kit may be provided, comprising two, three or more cables 1 as described above, the cables 1 having different lengths. This may facilitate a hearing aid professional to customize a hearing aid to the geometry of an ear of a user.

Figure 3:
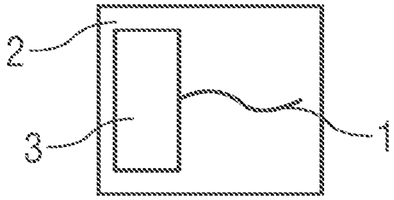
FIG. 3 is a schematic view of a hearing device having a transducer module and a cable according to FIG. 1.

FIG. 3 is a schematic view of a hearing device 2 having a transducer module 3 or another electronic component or module such as a sensor or sensor module and a cable 1 according to FIG. 1 connecting the transducer module 3.

LIST OF REFERENCES

1 cable
C1 to C10 curve
EAI equivalent acoustic input
f frequency
FS filler strand
FW core wire
TP1 twisted pair, input lines
TP2 twisted pair, power supply lines
TP3 twisted pair, ground lines
TP4 twisted pair, output lines
W shielding wrap

What is claimed is:

1. A hearing device, comprising an In-the-Ear module comprising multiple electronic components and a cable comprising a plurality of conductors, the plurality of conductors comprising conductors arranged in twisted pairs wound around a plastically deformable core wire, the cable connecting the In-the-Ear module, the In-the-Ear module having at least two input lines and two output lines, wherein at least one of the following applies:

the two input lines are carried in one of the twisted pairs, or the two output lines are carried in one of the twisted pairs, and wherein the In-the-Ear module has at least two ground lines carried in another one of the twisted pairs.

2. The hearing device according to claim 1, wherein at least one of the twisted pair conducting the input lines or the twisted pair conducting the output lines are/is shielded by a respective shielding wrap arranged around the twisted pair.

3. The hearing device according to claim 1, wherein the In-the-Ear module has at least two power supply lines carried in another one of the twisted pairs.

4. The hearing device according to claim 3, wherein the twisted pair conducting the input lines is arranged next to the twisted pair conducting the power supply lines and next to the twisted pair conducting the output lines.

5. The hearing device according to claim 3, wherein the twisted pair conducting the input lines is arranged next to the twisted pair conducting the power supply lines and next to the twisted pair conducting the at least two ground lines.

6. The hearing device according to claim 5, wherein two filler strands are arranged between the twisted pair conducting the input lines and the twisted pair conducting the output lines, wherein one respective filler strand is arranged between all other pairs of twisted pairs arranged next to each other.

* * * * *